United States Patent Office 3,010,982
Patented Nov. 28, 1961

---

3,010,982
SYMMETRICAL SILOXANYLFERROCENES
Robert L. Schaaf, Wyandotte, and Carl T. Lenk, Trenton, Mich., and Harold Rosenberg, Medway, Ohio; said Schaaf and said Lenk assignors to Wyandotte Chemicals Corporation, Wyandotte, Mich., a corporation of Michigan
No Drawing. Filed Apr. 7, 1960, Ser. No. 20,512
7 Claims. (Cl. 260—439)

This invention relates to a new class of compositions of matter, symmetrical siloxanylferrocenes.

Silanylferrocenes are known compounds that have been prepared and some properties examined. Such materials possess good lubricity, liquid range and relatively high boiling points and their thermal stability properties are relatively good. Silanylferrocenes are deficient, however, in terms of extended liquid range, thermal stability at high temperatures and in certain other respects.

It is an object of the present invention to provide a new class of liquid and solid materials for use as dielectrics, greases, lubricants and hydraulic fluids, such liquid and solid materials to be resistant to thermal degradation, in particular.

The compounds of the present invention are symmetrical siloxanylferrocenes that are defined by the general formula,

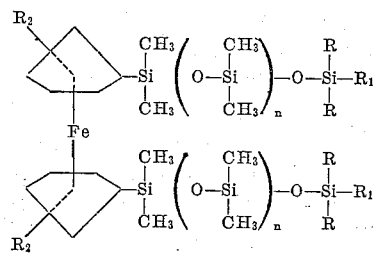

In the above formula, R and $R_1$ can be methyl or phenyl radicals, $R_2$ can be hydrogen or a methyl radical, and $n$ can be 0, 1 or 2.

It will be observed from the general formula for the new class of compounds that the compounds are di-, tri- or tetrasiloxanylferrocenes. The particular species that have been found to be most thermally stable are the di- and trisiloxanylferrocenes and, therefore, these are the preferred species. For example, the data reported hereinafter shows that the trisiloxanylferrocene, 1,1'-bis(5-phenylhexamethyltrisiloxanyl)ferrocene has a boiling point of over 850° F., a pour point of —31° C. and most importantly, suffered a weight loss of only 0.4 weight percent after being held at 366° C. (690.8° F.) for 10 hours under nitrogen.

In the formula for the class of compounds of the invention, above, and which appears in the claims, the representation of the ferrocenyl radical by the symbols,

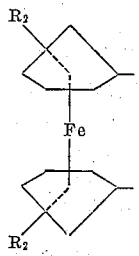

where $R_2$ is hydrogen will be understood to stand for the structure where one atom of iron is bound to two cyclopentadienyl rings. When $R_2$ is methyl, the methyl radicals can be attached at any position about the cyclopentadiene ring and such compounds are indicated by the nomenclature, x,x-dimethylferrocene.

Examples of compounds of the invention are 1,1'-bis(3-phenyltetramethyldisiloxanyl)ferrocene,
1,1'-bis(5-phenylhexamethyltrisiloxanyl)ferrocene,
1,1'-bis(7-phenyloctamethyltetrasiloxanyl)ferrocene,
1,1'-bis(3,3,3-triphenyl-1,1-dimethyldisiloxanyl)ferrocene,
1,1'-bis(5,5,5-triphenyl-1,1,3,3-tetramethyltrisiloxanyl)-
  ferrocene,
1,1'-bis(7,7,7-triphenyl-1,1,3,3,5,5-hexamethyltetrasiloxanyl)ferrocene,
1,1'-bis(1,1,3,3,3-pentamethyldisiloxanyl)ferrocene,
1,1'-bis(1,1,3,3,5,5,5-heptamethyltrisiloxanyl)ferrocene,
1,1'-bis(1,1,3,3,5,5,7,7,7-nonamethyltetrasiloxanyl)-
  ferrocene,
1,1'-bis(3-phenyltetramethyldisiloxanyl)-x,x'dimethyl-
  ferrocene,
1,1'-bis(5-phenylhexamethyltrisiloxanyl)-x,x'dimethyl-
  ferrocene,
1,1'-bis(3,3,3-triphenyl-1,1-dimethyldisiloxanyl)-x,x-di-
  methylferrocene, and the like.

Silicon-substituted ferrocenes previously described have been mono- or bis(triarylsilyl)ferrocenes or trialkylsilylferrocenes and these compounds were prepared either by addition of a trisubstituted chlorosilane to a metalated ferrocene or by treatment of a trisubstituted-silyl cyclopentadiene successively with butyllithium and ferrous chloride. The latter method was adapted for use in preparing the symmetrical siloxanylferrocenes of the invention.

EXAMPLE I 1,1'-bis(3 - phenyltetramethyldisiloxanyl)ferrocene was prepared.

STEP A

A solution of n-butyllithium, obtained by the method of R. G. Jones and H. Gilman, Organic Reactions, 6, 339 (1951), was prepared from 6.0 mols of n-butyl bromide and was added dropwise during a one-hour period to a stirred solution of 397 grams (6.0 mols) of cyclopentadiene in 3600 milliliters of anhydrous ether under nitrogen in an ice bath. After the mixture was stirred an additional 1.5 hours without the ice bath, a mixture of 1460 milliliters (12 mols) of the dimethyldichlorosilane in 1500 milliliters of ether was added in one portion and the mixture refluxed 17 hours. The volume of the mixture was then reduced by vacuum distillation, the mixture was filtered and washed with ether.

After removal of volatile material from the filtrate under vacuum, distillation of the residue through a 20-cm. Vigreux column gave a friction, 657 grams, B.P. 37–40° C. at 7–4.5 mm. Hg pressure. The yield was 69%.

Analysis of the product showed that cyclopentadienyldimethylchlorosilane was produced having the empirical formula $C_7H_{11}ClSi$. Elemental analyses give the following results:

|  | Calculated | Found |
|---|---|---|
| Carbon, percent | 52.97 | 53.08 |
| Hydrogen, percent | 6.99 | 6.87 |
| Chlorine, percent | 22.34 | 22.36 |
| Silicon, percent | 17.70 | 17.81 |

STEP B

A solution of 39.7 grams (0.25 mol) of cyclopentadienyldimethylchlorosilane in 100 milliliters of anhydrous ether was stirred under nitrogen in an ice bath while a solution of 43.5 grams (0.25 mol) of sodium phenyldimethylsilanolate in 100 milliliters of anhydrous ether was added during a five-minute period.

The mixture was allowed to come to room temperature while it was stirred 12 hours. Precipitated solid material was removed by centrifugation and washed with ether. The combined filtrate and washes were evaporated in vacuo and distillation of the residue gave 55.0 grams, B.P. 83–86° C., at 0.03–0.05 mm. Hg pressure, an 80% yield. This intermediate product was 1-cyclopentadienyl-3-phenyltetramethyldisiloxane having the empirical formula, $C_{15}H_{22}OSi_2$. Elemental analyses gave the following results:

|  | Calculated | Found |
| --- | --- | --- |
| Carbon, percent | 65.63 | 65.81 |
| Hydrogen, percent | 8.08 | 8.07 |
| Silicon, percent | 20.46 | 20.33 |

STEP C

The composition of the invention, 1,1'-bis(3-phenyltetramethyldisiloxanyl)ferrocene, then was prepared by adding n-butyllithium solution, prepared from 0.1 mol of n-butyl bromide, during a 1.3 hour period to a solution of 27.5 grams (0.1 mol) of 1-cyclopentadienyl-3-phenyltetramethyldisiloxane in 100 milliliters of anhydrous ether with stirring under a blanket of nitrogen. The mixture was stirred and refluxed for 18 hours and then cooled. Ferrous chloride solution, which had been freshly prepared by the method of G. Wilkinson, Organic Syntheses, 36, 31 (1956), from 5.4 grams (0.033 mol) of ferric chloride and 0.95 gram of 325 mesh reduced iron, was washed into the stirred mixture with 100 milliliters of anhydrous tetrahydrofuran. Ether was removed by distillation and the mixture was refluxed 15 hours under nitrogen. The reaction mixture was then evaporated in vacuo and the residue extracted with petroleum ether. Removal of solvent from the extract and fractionation of the residue gave 17.6 grams, a 59% yield, of 1,1'-bis(3-phenyltetramethyldisiloxanyl)ferrocene, having a boiling point of 200–205° C. at 0.03 mm. Hg pressure and having a melting point of 18–19.5° C. The pour point of this product was −31° C. Elemental analyses of the product having an empirical formula of $C_{30}H_{42}FeO_2Si_4$ gave the following results:

|  | Calculated | Found |
| --- | --- | --- |
| Carbon, percent | 59.76 | 59.94 |
| Hydrogen, percent | 7.02 | 6.93 |
| Iron, percent | 9.26 | 9.36 |

EXAMPLE II 1,1'-bis(5-phenylhexamethyltrisiloxanyl)ferrocene was prepared by the same method, in general, as that described in Example I.

1-cyclopentadienyl-3-chlorotetramethyldisiloxane was produced by reacting 1,3-dichlorotetramethyldisiloxane with cyclopentadienyllithium by the method described in Example I, Step A.

1-cyclopentadienyl-5-phenylhexamethyltrisiloxane was then produced by reacting sodium phenyldimethylsilanolate with 1-cyclopentadienyl-3-chlorotetramethyldisiloxane by the method described in Example I, Step B.

1,1'-bis(5-phenylhexamethyltrisiloxanyl)ferrocene was then produced by the sequential reaction of 1-cyclopentadienyl-5-phenylhexamethyltrisiloxane with n-butyllithium and ferrous chloride, by the method described in Example I, Step C.

This compound of the invention had a boiling point of 220–223° C. at 0.15 mm. Hg pressure. The pour point of this product was −40° C.

EXAMPLE III 1,1'-bis(7-phenyloctamethyltetrasiloxanyl)ferrocene was prepared by the general method described in Example I.

First, 1-cyclopentadienyl-5-chlorohexamethyltrisiloxane was produced by the reaction of cyclopentadienyllithium with 1,5-dichlorohexamethyltrisiloxane by the general method of Step A, Example I.

Next, 1-cyclopentadienyl-7-phenyloctamethyltetrasiloxane was produced by the reaction of 1-cyclopentadienyl-5-chlorohexamethyltrisiloxane with sodium phenyldimethylsilanolate by the general method of Step B, Example I.

Finally, 1-cyclopentadienyl-7-phenyloctamethyltetrasiloxane was converted to the ferrocene compound of the invention, 1,1'-bis(7-phenyloctamethyltetrasiloxanyl)ferrocene, by the general method of Step C, Example I. The yield of the final product was 50% and the final product boiled at 245–255° C. at 0.04 mm. Hg pressure. The pour point of this product was −57° C.

EXAMPLE IV

First, methylcyclopentadienyldimethylchlorosilane was produced by the general method of Step A, Example I, in which methylcyclopentadiene was used instead of cyclopentadiene.

Next, 1-(methylcyclopentadienyl)-3-phenyltetramethyldisiloxane was produced by reacting methylcyclopentadienyldimethylchlorosilane with sodium phenyldimethylsilanolate by the general method of Step B, Example I.

Finally, the composition of the invention, 1,1'-bis(3-phenyltetramethyldisiloxanyl)-x,x'-dimethylferrocene, was produced by the sequential reaction of 1-(methylcyclopentadienyl)-3-phenyltetramethyldisiloxane with n-butyllithium and ferrous chloride by the general method of Step C, Example I. The final product was obtained in 52% yield and had a boiling point of 205–215° C. at 0.07 mm. Hg pressure. The pour point of this product was −22° C.

EXAMPLE V

First, 52.9 grams (0.333 mol) of cyclopentadienyldimethylchlorosilane, produced by the method of Step A, Example I, in 400 milliliters of ether was cooled in an ice bath under nitrogen and treated with 26.4 grams (0.333 mol) of pyridine. Then, 97.5 grams (0.333 mol) of triphenylsilanol was washed into the mixture with 100 milliliters of ether and the reaction mixture was refluxed for 18 hours. Solids were removed by filtration and were washed with petroleum ether and with ether. The filtrate and washes were combined and evaporated in vacuo, the residue was extracted with 200 milliliters of petroleum ether and the insoluble, unreacted triphenylsilanol was removed by filtration and washed with 100 milliliters of petroleum ether. Upon distillation of the combined extract and washes, 1-cyclopentadienyl-1,1-dimethyl-3,3,3-triphenyldisiloxane was obtained.

The composition of the invention, 1,1'-bis(3,3,3-triphenyl-1,1-dimethyldisiloxanyl)ferrocene was then produced by the general method of Step C, Example I. When the product was recrystallized from acetone, it was found to have a melting point of 148.5–150° C.

EXAMPLE VI

First, cyclopentadienyldimethylchlorosilane, produced by the method of Step A, Example I, was reacted with sodium trimethylsilanolate by the method of Step B, Example I, to produce cyclopentadienylpentamethyldisiloxane.

The latter compound was converted to the composition of the invention, 1,1'-bis(pentamethyldisiloxanyl)ferrocene, by the general method of Step C, Example I. The final product was obtained in 55% yield and had a boiling point of 107–110° C. at 0.01 mm. Hg pressure.

The unusually desirable properties of the compositions of the invention as functional fluids under conditions of high temperature were shown by determining the weight loss of samples held at 366° C. (690.8° F.) for 10 hours under pure nitrogen. Changes in viscosity due to this treatment were also noted. To illustrate the wide liquid range of the compositions of the invention, the pour point was determined and an effort was made to determine the boiling point at atmospheric pressure.

The atmospheric pressure boiling point is, of course, higher than about 700° F. as shown by the thermal stability test described above. Actually, the compositions of the invention remain in liquid form up to about 850° F. or higher. In general, no clearly defined boiling points at atmospheric pressure were determined because the compounds of the invention begin to decompose slowly at about 850° F. and higher.

All of these properties are summarized below in Table 1.

*Table 1*

THERMAL STABILITY OF SYMMETRICAL SILOXANYL-FERROCENES

| Ex. No. | Compound | Weight Loss, Percent | Viscosity, cs. | |
|---|---|---|---|---|
| | | | Before | After |
| I | 1,1'-bis(3-phenyltetramethyl-disiloxanyl)-ferrocene. | 0.5 [1] 0.5 | 21.7 | [2] 23.5 |
| II | 1,1'-bis(5-phenylhexamethyltri-siloxanyl)-ferrocene. | 0.4 | 16.8 | 17.8 |
| III | 1,1'-bis(7-phenyloctamethyltetra-siloxanyl)-ferrocene. | [3] 2.6 | 17.2 | [2] 16.8 |
| IV | 1,1'-bis(3-phenyltetramethyldi-siloxanyl)-x,x'-dimethylferrocene. | 1.1 | 30.8 | [2] 31.0 |
| V | 1,1'-bis(3,3,3-triphenyl-1,1-dimethyldisiloxanyl)ferrocene. | 1.0 | (4) | (4) |

[1] Determined after 18 hours.
[2] Determined after filtration.
[3] Sample additionally purified by chromatography on alumina before tested.
[4] Viscosity not determined because product was a solid at 100° F.

In addition to the desirable properties of wide liquid range and exceptional thermal stability, the compositions of the invention have favorable electrical properties. These are summarized below for the product of Example II, 1,1'-bis(5-phenylhexamethyltrisiloxanyl)ferrocene.

*Table 2*

ELECTRICAL PROPERTIES OF 1,1'-BIS(5-PHENYLHEXA-METHYLTRISILOXANYL)FERROCENE

| Temp., ° C. | Frequency, c.p.s.[1] | Dielectric Constant | Dissipation Factor | Conductivity, mho/cm. |
|---|---|---|---|---|
| 25 | $10^2$ | 2.76 | $1.58 \times 10^{-3}$ | $2.42 \times 10^{-13}$ |
| 25 | $10^3$ | 2.76 | $1.42 \times 10^{-4}$ | $2.16 \times 10^{-13}$ |
| 60 | $10^2$ | 2.67 | $8.50 \times 10^{-3}$ | $1.26 \times 10^{-12}$ |
| 60 | $10^3$ | 2.67 | $9.18 \times 10^{-4}$ | $1.36 \times 10^{-12}$ |

[1] C.p.s. is cycles per second.

We claim:
1. As a new composition of matter, a symmetrical siloxanylferrocene selected from the group consisting of symmetrical siloxanylferrocenes defined by the formula,

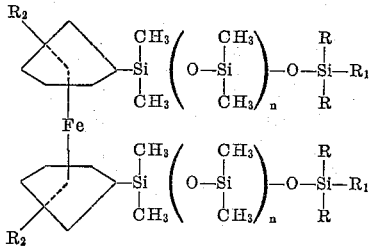

wherein $n$ is an integer from 0 to 2, inclusive, and wherein R is a member selected from the group consisting of methyl and phenyl radicals, $R_1$ is a member selected from the group consisting of methyl and phenyl radicals and $R_2$ is a member selected from the group consisting of hydrogen and methyl radicals.

2. 1,1'-bis(3-phenyltetramethyldisiloxanyl)ferrocene.
3. 1,1'-bis(5-phenylhexamethyltrisiloxanyl)ferrocene.
4. 1,1'-bis(7-phenyloctamethyltetrasiloxanyl)ferrocene.
5. 1,1' - bis(3 - phenyltetramethyldisiloxanyl)-x,x'-dimethylferrocene.
6. 1,1'-bis(3,3,3-triphenyl - 1,1 - dimethyldisiloxanyl)-ferrocene.
7. 1,1'-bis(pentamethyldisiloxanyl)ferrocene.

References Cited in the file of this patent
UNITED STATES PATENTS
2,831,880    Benkeser _____ Jan. 3, 1955